Nov. 15, 1927.

F. A. STEVENS

OPHTHALMIC MOUNTING

Original Filed Jan. 22, 1924

Inventor:-
Frederick A. Stevens.

by David Rines
Attorney;-

Patented Nov. 15, 1927.

1,649,795

UNITED STATES PATENT OFFICE.

FREDERICK A. STEVENS, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed January 22, 1924, Serial No. 687,715. Renewed November 20, 1926.

The present invention relates to ophthalmic mountings comprising non-metal members, such as temples and lens-holding frames, that are connected together by metal hinges, and it has for its object to secure the hinges in place upon the non-metal members in a new and improved manner. The present application is a continuation in part of copending applications, Serial Nos. 477,146, filed June 13, 1921 and 489,947, filed August 5, 1921, the former of which matured into Patent No. 1,576,868 on March 16, 1926.

Figure 1:
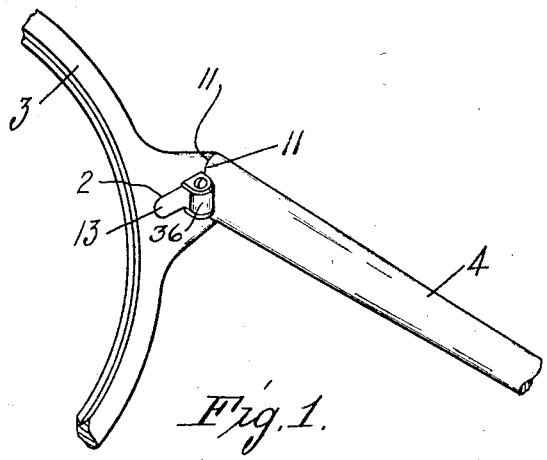
Figure 2:
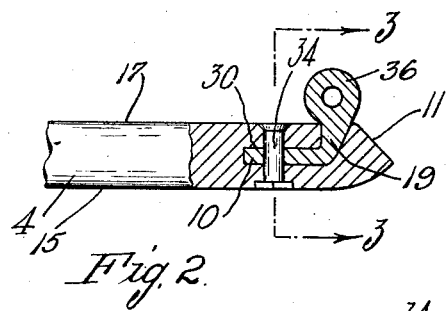
Figure 3:
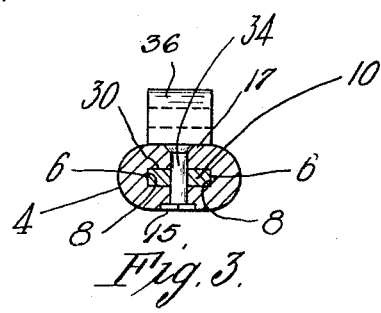

In the accompanying drawings, Fig. 1 is a fragmentary perspective view of an ophthalmic mounting comprising a lens-holding frame and a temple hinged thereto according to the present invention; Fig. 2 is a fragmentary view, in elevation, partly in section, of a temple constructed according to a preferred embodiment of the invention; and Fig. 3 is a section taken upon the line 3—3 of Fig. 2, looking in the direction of the arrows.

In commercial ophthalmic mountings of the above-described character, the pivotally connected hinge plates of the metal hinges have hitherto been secured to the non-metal members by pairs of rivets passing through the hinge plates and the members. These have not been fully satisfactory. According to the present invention, the hinge plate 10 is mounted in a hinge-plate-receiving bore or recess 30 of the non-metal member, such as a lens-receiving frame 3, or a temple 4. The face 15 may be regarded as the front and the face 17 as the rear of the non-metal member. The bore 30 extends into the non-metal member a distance very small compared to the length of the non-metal member, as illustrated, and is provided with oppositely disposed, blunt walls 6 that close the sides of the bore. The walls 8 of the hinge plate 10 in contact with the walls 6 are correspondingly blunt, so that twisting or turning of the hinge plate within its bore is prevented. The lens-receiving frame 3 and the temple 4 are shown provided with beveled end faces 11 that are adapted to engage when the temple occupies its open position, as illustrated in Fig. 1, to limit the pivotal movement of the temple. To facilitate this construction, one hinge plate 10 only is shown mounted in a bore 30, the other hinge plate 13 being shown seated in an open-sided recess 2, flush with the non-metal member. The recess 2 is shown in the lens-receiving frame 3 and the bore 30 in the temple 4, but it is obvious that this construction may be reversed. Indeed, the lens-receiving frame 3 and the temple 4, may both be provided with a bore 30, each adapted to receive one of the hinge plates 10 and 13 of the hinge. The bore 30 is more or less rectangular in cross section, as shown in Fig. 3, so as to provide a snug fit for the hinge plate, but its cross dimension is small compared to the cross dimension of the nonmetal member. Longitudinal movement of the hinge plate within the bore may be prevented by the use of cement or, preferably, by the use of single rivets or screws 34 that enter the non-metal material and pass through the hinge plate. The bore 30 may be open-ended or not, as desired. In the drawings, the bore is shown opening into the face 17, instead of into the end of the non-metal member. The inner end of the bore is shown closed. The body of the hinge plate 10 is thus wholly embedded in the non-metal member, between the front face 15 and the rear face 17, and is provided with a rearwardly bent extension 19. The extension 19 of the hinge plate is provided with a hinge knuckle 36 that projects rearward beyond the rear face 17 so as to be completely exposed at the rear of the non-metal member. A hinge plate so mounted can not accidentally become separated from the part to which it is secured, and it can not twist or otherwise become loosened.

The invention is not restricted to the exact embodiment thereof that is illustrated and described herein, but is subject to modification within the spirit and scope of the appended claims.

What is claimed is:

1. An ophthalmic mounting comprising a non-metal member having a front face, a rear face and an end face, a hinge element having a body portion wholly embedded in the non-metal member between the front face and the rear face, the hinge element having an exposed hinge knuckle projecting rearward through the rear face but not through the end face, and a rivet or screw extending through the hinge element and the non-metal member for securing the hinge element to the non-metal member, the non-metal member being adapted to be hinged by the hinge knuckle to another member, one of the members being adapted to hold lenses and the other member comprising a temple.

2. An ophthalmic mounting comprising a non-metal member having a bore one end of which is open, the bore extending into the non-metal member a distance very small compared to the length of the non-metal member, the other end of the bore and the sides of the bore being closed, the cross dimension of the bore being small compared to the cross dimension of the non-metal member, the said sides of the bore being constituted of blunt walls, a hinge comprising a hinge plate in the bore shaped to conform to the shape of the bore and having blunt walls in contact with the blunt walls of the bore, and means for securing the hinge plate within the bore, the non-metal member being adapted to be hinged by the hinge to another member, one of the members being adapted to hold lenses and the other member comprising a temple.

3. An ophthalmic mounting comprising a non-metal member having a bore one end of which is open, the bore extending into the non-metal member a distance very small compared to the length of the non-metal member, the other end of the bore and the sides of the bore being closed, a hinge comprising a hinge plate in the bore shaped to conform to the shape of the bore, and means extending through the hinge plate and the member for securing the hinge plate in the bore, the non-metal member being adapted to be hinged by the hinge to another member, one of the members being adapted to hold lenses and the other member comprising a temple.

4. An ophthalmic mounting comprising two members, and a hinge comprising a plurality of pivotally connected hinge plates, one of the members having a bore of substantially rectangular cross section and provided with blunt walls, one end of the bore being open, the other end of the bore and the sides of the bore being closed, one of the hinge plates being mounted in the bore, the said hinge plate being substantially rectangular in cross section and having walls in contact with the blunt walls of the bore, and the other hinge plate being secured to the other member.

5. An ophthalmic mounting comprising two members constituted of non-metal material, one a lens-receiving frame and the other a temple, a hinge pivotally connecting the temple to the frame and comprising two pivotally connected hinge plates, one of the hinge plates being of substantially rectangular cross section, one of the members having a bore of substantially rectangular cross section and provided with blunt walls, one end of the bore being open, the other end of the bore and the sides of the bore being closed, the said hinge plate being mounted in the bore and having walls in contact with the blunt walls of the bore, the other hinge plate being secured to the other member, and means extending through the said one hinge plate and the said one member for securing the hinge plate in the bore.

6. An ophthalmic mounting comprising a non-metal member having a front face, a rear face and an end face, and a hinge element having a body portion embedded in the non-metal member between the front face and the rear face and extending into the non-metal member a distance small compared to the length of the non-metal member and being bent rearward so as to project rearward through the rear face but not through the end face and having a terminal hinge knuckle that is completely exposed at the rear of the non-metal member, the non-metal member being adapted to be hinged by the hinge knuckle to another member, one of the members being adapted to hold lenses and the other member comprising a temple.

7. An ophthalmic mounting comprising a non-metal member having a front face, a rear face and an end face and having a bore of cross dimension small compared to the cross dimension of the non-metal member extending into the non-metal member a distance very small compared to the length of the non-metal member, the sides of the bore and one end of the bore being closed and the other end of the bore opening into the rear face of the non-metal member but not into the end face, and a hinge element having a body portion fixed in the bore and being bent rearward, the bent portion of the hinge element projecting rearward through the open end of the bore and having a hinge knuckle that is completely exposed at the rear of the non-metal member, the non-metal member being adapted to be hinged by the hinge knuckle to another member, one of the members being adapted to hold lenses and the other member comprising a temple.

8. An ophthalmic mounting comprising a non-metal member having a front face, a rear face and an end face and having a bore extending into the non-metal member a distance small compared to the length of the non-metal member, one end of the bore opening into the rear face of the non-metal member but not into the end face, and a hinge element having a body portion fixed in the bore and being bent rearward so as to project rearward through the open end of the bore in the rear face and having a hinge knuckle that is completely exposed at the rear of the non-metal member, the non-metal member being adapted to be hinged by the hinge knuckle to another member, one of the members being adapted to hold lenses and the other member comprising a temple.

9. An ophthalmic mounting comprising a non-metal member having a front face, a rear face and an end face, and a hinge element having a body portion embedded in the non-metal member between the front face and the rear face and being bent rearward so as to project rearward through the rear face but not through the end face, the portion of the hinge element that is exposed to the rear of the rear face constituting a hinge knuckle, the non-metal member being adapted to be hinged by the hinge knuckle to another member, one of the members being adapted to hold lenses and the other member comprising a temple.

10. An ophthalmic mounting including a non-metal member having a front face, a rear face and an end face, and a hinge element comprising a body portion and a portion extending from the body portion to which another member is adapted to be hinged, the body portion of the hinge element being embedded in the non-metal member between the front face and the rear face with the extending portion projecting rearward through the rear face but not through the end face, whereby at least a portion of the extending portion is concealed by the end face.

11. An ophthalmic mounting including a non-metal member having a front face, a rear face and an end face, and a hinge element comprising a flat-plate body portion and a portion extending from the body portion and to which another member is adapted to be hinged, the non-metal member having a recess receiving the body portion and a part of said extending portion, the remainder of said extending portion projecting rearward beyond the rear face but not through the end face, whereby the end of said non-metal member extends circumferentially about said extending portion to conceal a part of said extending portion from view laterally and exteriorly of the non-metal member, and a single rivet securing said hinge element to said non-metal member.

12. An ophthalmic mounting comprising a non-metal member having a front face, a rear face and an end face, and a hinge element comprising a body portion and a portion extending from the body portion and to which another member is adapted to be hinged, the non-metal member having a recess receiving the body portion and a part of said extending portion and in which the hinge element is secured, the remainder of said extending portion projecting rearward beyond the rear face but not through the end face, whereby the end of said non-metal member extends circumferentially about said extending portion to conceal a part of said extending portion, one of the members being adapted to hold lenses and the other member comprising a temple.

In testimony whereof, I have hereunto subscribed my name this 17th day of January, 1924.

FREDERICK A. STEVENS.